United States Patent
Thomsen

(10) Patent No.: US 7,597,938 B2
(45) Date of Patent: ***Oct. 6, 2009

(54) METHOD OF MAKING COATED ARTICLE WITH COLOR SUPPRESSION COATING INCLUDING FLAME PYROLYSIS DEPOSITED LAYER(S)

(75) Inventor: Scott V. Thomsen, South Lyon, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 620 days.

This patent is subject to a terminal disclaimer.

(21) Appl. No.: 10/998,176

(22) Filed: Nov. 29, 2004

(65) Prior Publication Data

US 2006/0115654 A1    Jun. 1, 2006

(51) Int. Cl.
    *C23C 4/10*    (2006.01)
(52) U.S. Cl. ............... 427/452; 427/453; 427/454; 427/165; 427/167; 427/255.29; 427/255.31; 427/255.7
(58) Field of Classification Search ........... 427/255.29, 427/452, 453, 165, 166, 167, 454, 255.31
    See application file for complete search history.

(56) References Cited

U.S. PATENT DOCUMENTS

| | | | | |
|---|---|---|---|---|
| 3,739,146 A | * | 6/1973 | Gilliom | 219/393 |
| 3,883,336 A | | 5/1975 | Randall | |
| 3,936,659 A | * | 2/1976 | Mainord | 219/413 |
| 4,337,990 A | * | 7/1982 | Fan et al. | 359/360 |
| 4,600,390 A | | 7/1986 | Göbel et al. | |
| 4,620,988 A | | 11/1986 | Garschke et al. | |
| 5,652,021 A | * | 7/1997 | Hunt et al. | 427/248.1 |
| 5,751,484 A | * | 5/1998 | Goodman et al. | 359/512 |
| 5,958,361 A | * | 9/1999 | Laine et al. | 423/610 |
| 6,024,084 A | * | 2/2000 | Gerhardinger | 126/200 |
| 6,027,766 A | * | 2/2000 | Greenberg et al. | 427/226 |
| 6,060,178 A | * | 5/2000 | Krisko | 428/627 |
| 6,261,693 B1 | | 7/2001 | Veerasamy | |
| 6,284,377 B1 | | 9/2001 | Veerasamy | |
| 6,303,225 B1 | | 10/2001 | Veerasamy | |
| 6,320,164 B2 | * | 11/2001 | Millett | 219/391 |
| 6,387,346 B1 | | 5/2002 | Bertsch-Frank et al. | |
| 6,423,414 B1 | * | 7/2002 | Legrand et al. | 428/426 |
| 6,513,435 B2 | * | 2/2003 | Detzner | 101/487 |

(Continued)

FOREIGN PATENT DOCUMENTS

CA    1059842    *    8/1979

(Continued)

*Primary Examiner*—Bret Chen
(74) *Attorney, Agent, or Firm*—Nixon & Vanderhye P.C.

(57) ABSTRACT

A method of making an oven door, or other coated article, is provided so as to have a color suppression coating on a substrate such as a glass substrate. Flame pyrolysis (or combustion CVD) is used in depositing at least part of a color suppression coating. For example, in an example embodiment of this invention, flame pyrolysis can be used to deposit a single $SnO_2$ layer from suitable Sn inclusive precursor(s), or alternatively a multi-layer coating may be formed at least partially using flame pyrolysis. In another example embodiment, the coating may include a base layer of silicon oxide formed using flame pyrolysis, and another layer of tin oxide formed in any suitable manner over the base layer of silicon oxide.

5 Claims, 2 Drawing Sheets

U.S. PATENT DOCUMENTS

| | | | |
|---|---|---|---|
| 6,797,388 B1 * | 9/2004 | Szanyi et al. | 428/432 |
| 6,929,970 B2 | 8/2005 | Andriessen et al. | |
| 6,959,705 B2 * | 11/2005 | Briedis et al. | 126/193 |
| 2002/0104836 A1 | 8/2002 | Goodsel et al. | |
| 2003/0113550 A1 * | 6/2003 | Millett et al. | 428/432 |
| 2003/0194551 A1 * | 10/2003 | Sasa et al. | 428/332 |
| 2004/0036993 A1 * | 2/2004 | Tin | 359/883 |
| 2004/0211405 A1 * | 10/2004 | Briedis et al. | 126/200 |
| 2004/0214010 A1 * | 10/2004 | Murata et al. | 428/426 |
| 2005/0064205 A1 * | 3/2005 | Sawada et al. | 428/432 |
| 2006/0180141 A1 * | 8/2006 | Schnell et al. | 126/200 |
| 2007/0077411 A1 * | 4/2007 | Hatta et al. | 428/323 |

FOREIGN PATENT DOCUMENTS

| | | | |
|---|---|---|---|
| EP | 1038849 A1 * | | 3/2000 |
| EP | 1293726 A2 * | | 3/2003 |
| JP | 2000-228159 | * | 8/2000 |
| JP | 2006-248871 | * | 9/2006 |
| WO | WO00/32391 | * | 8/2000 |
| WO | WO 01/55043 A1 * | | 8/2001 |

* cited by examiner

METHOD OF MAKING COATED ARTICLE WITH COLOR SUPPRESSION COATING INCLUDING FLAME PYROLYSIS DEPOSITED LAYER(S)

Certain example embodiments of this invention relate to a coated article including a coating thereon which suppresses or reduces natural reflected color of the article. In certain embodiments, a multi-layer suppression coating is provided on a glass substrate, and includes at least one layer which is deposited via flame pyrolysis.

BACKGROUND AND SUMMARY OF EXAMPLE EMBODIMENTS OF THE INVENTION

Many applications of float glass (e.g., soda lime silica glass), such as oven doors, require implementation of a coating for suppressing the natural reflected color of the glass. More neutral, aesthetically pleasing reflected chromaticity has been achieved by such coatings in the past via use of simple single layer coatings such as pyrolytic $SnO_2$:F and SiON layers, as well as multilayer designs.

Unfortunately, creation of $SnO_2$:F color suppression layers typically requires deposition of the $SnO_2$:F layer onto molten glass as the glass is made on a suitably outfitted float line. The task of outfitting a float line with equipment for applying pyrolytic coatings is burdensome and costly, and can sometimes interfere with the float line itself.

Moreover, coating float glass after it leaves the float line with a SiON color suppression layer requires access to expensive CVD equipment such as a magnetron sputtering apparatus which applies such coatings at a pressure less than atmospheric. Again, this equipment is very capital intensive and costly.

In order to solve problems such as those discussed above, an improved method of making a color suppression coating is provided. In particular, flame pyrolysis (or combustion CVD) is used in depositing at least part of a color suppression coating.

For example, in an example embodiment of this invention, flame pyrolysis can be used to deposit a single $SnO_2$ layer from suitable Sn inclusive precursor(s) (e.g., dimethyl tin and/or tetramethyl tin). This single $SnO_2$ layer on a glass substrate may function as a color suppression coating.

In other example embodiments of this invention, a cost effective and flexible color suppression layer system may be formed via flame pyrolysis so as to include the following stack: glass/$SnO_2$/$SiO_2$/$SnO_2$. In certain example instances, all three layers of this stack may be deposited using flame pyrolysis using sequential burner heads. For instance, a first flame pyrolysis burner(s) may be used to deposit the first $SnO_2$ layer, a second flame pyrolysis burner(s) may be used to deposit the $SiO_2$ layer, and a third flame pyrolysis burner(s) may be used to deposit the second or overcoat $SnO_2$ layer. While the $SnO_2$ layers may be deposited via flame pyrolysis by introducing a suitable Sn inclusive precursor(s) such as dimethyl tin and/or tetramethyl tin gas and/or liquid into a flame, the $SiO_2$ layer may be deposited via flame pyrolysis by introducing a suitable Si inclusive precursor(s) such as a silane gas and/or liquid into a flame.

In certain example embodiments of this invention, there is provided a method of making an oven door, the method comprising providing a glass substrate, and using flame pyrolysis to deposit a first layer comprising tin oxide on the glass substrate.

In other example embodiments of this invention, there is provided method of making a coated article, the method comprising providing a glass substrate, and using flame pyrolysis to deposit a first layer comprising tin oxide on the glass substrate.

In still further example embodiments of this invention, there is provided a method of making a coated article, the method comprising providing a glass substrate, and using flame pyrolysis to deposit at least first, second and third layers on the glass substrate in this order, wherein the second layer has an index of refraction less than an index of refraction of the first layer and less than an index of refraction of the third layer.

In other example embodiments of this invention, there is provided a method of making a coated article (e.g., oven door), the method comprising providing a glass substrate; using flame pyrolysis to deposit a first layer comprising silicon oxide on the glass substrate; and forming a second layer comprising a metal oxide (e.g., tin oxide) on the glass substrate over at least the first layer comprising silicon oxide, wherein the second layer has an index of refraction higher than an index of refraction of the first layer comprising silicon oxide.

DETAILED DESCRIPTION OF EXAMPLE EMBODIMENTS OF THE INVENTION

Figure 1:
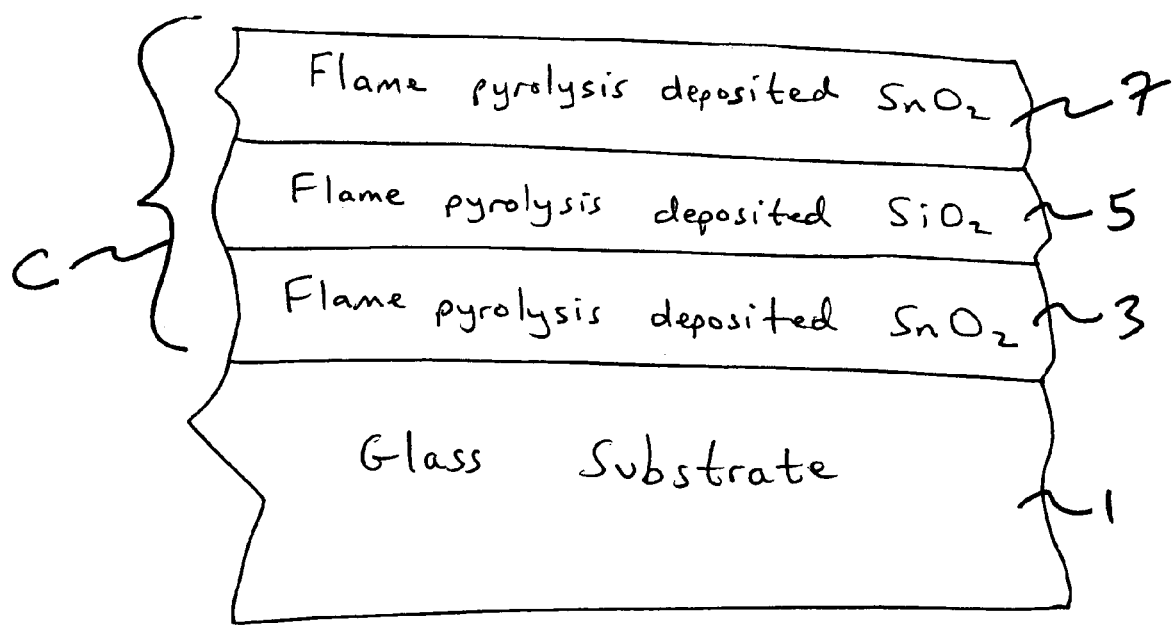
FIG. 1 is a cross sectional view of a coated article according to an example embodiment of this invention.

Referring now more particularly to the drawings in which like reference numerals indicate like parts or layers throughout the several views.

An improved method of making a color suppression coating, and resulting coated article, are provided. In particular, flame pyrolysis (or combustion CVD) is used in depositing at least part of a color suppression coating.

FIG. 1 is a cross sectional view of an example coated article according to an example embodiment of this invention. This coated article may be used as an oven door, or in any other suitable application where color suppression is desired. Alternatively, the coated article may be used for example as a coated for any glass panel or door in any other type of appliance.

The coated article of FIG. 1 includes a coating C provided on glass substrate 1, the coating C including first layer 3, second layer 5 and third layer 7. In certain example embodiments of this invention, all three layers 3, 5 and 7 are deposited on the glass substrate 1 using flame pyrolysis. In certain example embodiments, the second layer 5 has an index of refraction (n) that is less than the index of refraction (n) of layers 3 and 7. In certain example instances, the second layer 5 has an index of refraction (n) that is at least 0.2 (more preferably at least 0.3, and most preferably at least 0.4) less than the index of refraction (n) of layer 3 and/or the index of refraction (n) of layer 7. This permits coating C to function in a satisfactory manner to suppress reflective coloration of the glass substrate 1.

In the FIG. 1 embodiment, and when the coating is provided on a glass substrate 1 of an oven door for example, the coating C may be provided on either the inner surface (surface number two) or the outer surface (surface number one) of the oven door.

In certain example embodiments of this invention, layers 3 and 7 each have an index of refraction (n) of from about 1.6 to 2.2, more preferably from about 1.7 to 2.1, and most preferably from about 1.8 to 2.05 (at 550 nm). In a similar manner, in certain example embodiments of this invention, layer 5 has an index of refraction (n) of from about 1.4 to 1.8, more preferably from about 1.4 to 1.6, and most preferably from about 1.45 to 1.55 in certain example embodiments of this invention.

It is noted that layers 5 and/or 7 may be eliminated in certain example embodiments of this invention, so that coating C may be made up of solely layer 3 in certain example instances. For example, in an example embodiment of this invention, flame pyrolysis can be used to deposit a single $SnO_2$ layer 3 from suitable Sn inclusive precursor(s) (e.g., dimethyl tin and/or tetramethyl tin $[(CH_3)_4Sn]$. This single $SnO_2$ inclusive layer 3 on a glass substrate 1 may function as a color suppression coating.

In other example embodiments of this invention, a cost effective and flexible color suppression layer system C may be formed via flame pyrolysis at atmospheric pressure so as to include layer 3 of $SnO_2$, layer 5 of $SiO_2$ and layer 7 of $SnO_2$. These layers may comprise or consist essentially of these materials in certain example embodiments of this invention. In certain example instances, all three layers 3, 5 and 7 of this stack may be deposited using flame pyrolysis using sequential burner heads. For instance, a first flame pyrolysis burner(s) may be used to deposit the first $SnO_2$ layer 3, a second flame pyrolysis burner(s) may be used to deposit the $SiO_2$ layer 5, and a third flame pyrolysis burner(s) may be used to deposit the second or overcoat $SnO_2$ layer 7. While the $SnO_2$ inclusive layers 3 and 7 may be deposited via flame pyrolysis by introducing a suitable Sn inclusive precursor(s) such as dimethyl tin and/or tetramethyl tin gas and/or liquid into a flame, the $SiO_2$ layer may be deposited via flame pyrolysis by introducing a suitable Si inclusive precursor(s) such as a silane gas (e.g., TEOS) and/or liquid into a flame. The tin oxide layers 3 and/or 7 may be doped with other materials such as F in certain example embodiments of this invention.

For purposes of example only, an example of how a silicon oxide layer may be deposited via flame pyrolysis is as follows. In certain example embodiments of this invention, flame pyrolysis is used to deposit a layer 5 of or including silicon oxide (e.g., $SiO_2$). For example, a silane gas such as TEOS may be fed into at least one burner in order to cause a layer of silicon oxide to be deposited on glass substrate 1 at atmospheric pressure, possibly over other layer(s). Alternatively, the flame pyrolysis may utilize a liquid and/or gas including Si or other desirable material being fed into a flame of at least one burner. Layers 3 and 7 may be formed in a similar manner using flame pyrolysis, except that different precursor gas(es) and/or liquid(s) are used to form tin oxide instead of silicon oxide. Examples of flame pyrolysis are disclosed in, for example and without limitation, U.S. Pat. Nos. 3,883,336, 4,600,390, 4,620,988, 5,652,021, 5,958,361, and 6,387,346, the disclosures of all of which are hereby incorporated herein by reference.

Figure 2:
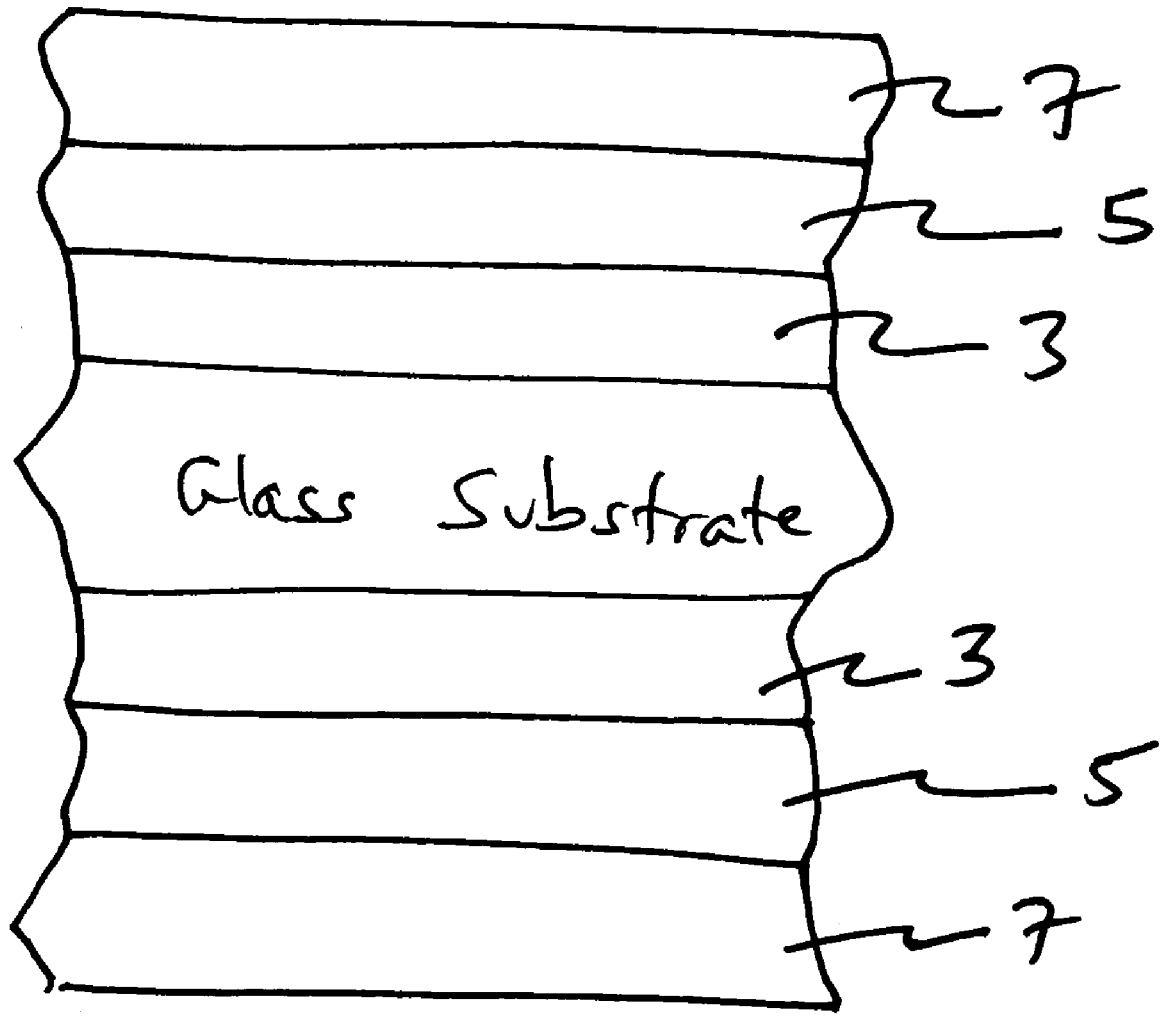
FIG. 2 is a cross sectional view of a coated article according to another example embodiment of this invention.

In FIG. 1, coating C is illustrated on only one side of the glass substrate 1. However, in certain example embodiments, this coating C may be provided on both sides of the glass substrate as shown in FIG. 2.

In certain example embodiments of this invention, the coated article of FIG. 1 or any other example embodiment discussed herein may have a visible transmission of at least 5%, more preferably of at least 10%, even more preferably of at least 30%, sometimes at least 50%, and possibly at least 70% in certain example instances.

In certain example embodiments, the coating C has no conductive layer (e.g., has no Ag layer or Au layer). Thus, there is no IR reflecting layer in the coating, and the coating does not function as a low-E coating in certain example embodiments of this invention. Glass substrate 1 is typically of float glass, but may be of other materials and/or other types of glass in alternative embodiments of this invention.

In certain example embodiments of this invention, layers may be added and/or deleted from the coating. For example and without limitation, an addition layer(s) may be located between the glass substrate and layer 3 in certain example embodiments. As another example, other layer(s) may be provided on the substrate over layer 7 in certain example instances. Moreover, other materials may be used instead of those illustrate in FIG. 1 in certain alternative embodiments of this invention.

Other types of color suppression coatings may be made using flame pyrolysis in other example embodiments of this invention. For example, consider the following examples of other embodiments of this invention.

The first alternative example is a glass substrate (e.g., for oven door or other suitable uses) with no coating on surface number one, but having a coating on surface number two comprising from the glass substrate outwardly a layer of silicon oxide and then a layer of tin oxide formed over the layer of silicon oxide. The layer of silicon oxide (e.g., $SiO_2$) is formed via flame pyrolysis as explained above, and the layer of tin oxide may or may not be formed via flame pyrolysis. In certain embodiments, the overlying layer of tin oxide is formed via a pyrolytic technique where the glass substrate with silicon oxide layer there is heated in a known manner; whereas in other example embodiments the layer of tin oxide is formed via flame pyrolysis.

The second alternative example is the same as the aforesaid first alternative example except that additionally a layer of tin oxide is also formed on surface number one of the glass substrate (e.g., for oven door or other suitable uses). In certain embodiments, the layer of tin oxide on surface number one of the glass substrate is formed via a pyrolytic technique where the glass substrate is heated; whereas in other example embodiments the layer of tin oxide on surface number one of the glass substrate is formed via flame pyrolysis.

The third alternative example is the same as the aforesaid first alternative example except that additionally another layer of tin oxide is formed on surface number two of the glass substrate between the glass and the silicon oxide layer (e.g., for oven door or other suitable uses). In certain embodiments, the another layer of tin oxide is formed via a pyrolytic technique where the glass substrate is heated; whereas in other example embodiments the another layer of tin oxide is formed via flame pyrolysis.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of making an oven door, the method comprising:

providing a glass substrate; and
   using flame pyrolysis to deposit a first layer comprising tin oxide on the glass substrate for the oven door, then using flame pyrolysis to deposit a silicon oxide layer over and contacting the first layer comprising tin oxide, and using flame pyrolysis to depositing a second layer comprising tin oxide over and contacting the layer comprising silicon oxide, so that the layer comprising silicon oxide is located between and contacting the first and second layers comprising tin oxide, and wherein at least one of the first and second layers comprising tin oxide comprises hydrogen and/or carbon.

2. The method of claim 1, further comprising using flame pyrolysis to deposit another layer comprising tin oxide on another side of the glass substrate so that layers deposited via flame pyrolysis are located on opposite sides of the glass substrate.

3. The method of claim 1, wherein the oven door has a visible transmission of at least 30%.

4. The method of claim 1, wherein the oven door has no IR reflecting layer comprising Ag and/or Au.

5. The method of claim 1, wherein the flame pyrolysis used in depositing the first layer comprising tin oxide introduces at least dimethyl tin and/or tetramethyl tin into a flame in order to cause the layer to be deposited.

* * * * *